(12) United States Patent
Guskov et al.

(10) Patent No.: US 8,388,814 B2
(45) Date of Patent: Mar. 5, 2013

(54) METHOD AND APPARATUS FOR THE TREATMENT OF DISPERSED MATERIAL

(75) Inventors: Mikhail Guskov, Sankt Petersburg (RU); Hermann Marsch, Posterstein (DE)

(73) Assignee: Maicom Quarz GmbH, Posterstein (DE)

( * ) Notice: Subject to any disclaimer, the term of this patent is extended or adjusted under 35 U.S.C. 154(b) by 646 days.

(21) Appl. No.: 12/408,957

(22) Filed: Mar. 23, 2009

(65) Prior Publication Data
US 2009/0250336 A1    Oct. 8, 2009

(30) Foreign Application Priority Data
Apr. 3, 2008 (EP) .................................... 08103363

(51) Int. Cl.
*B01J 19/08* (2006.01)
(52) U.S. Cl. ........................................ 204/164; 588/301
(58) Field of Classification Search .................. 204/164; 588/301
See application file for complete search history.

(56) References Cited

U.S. PATENT DOCUMENTS

| 4,616,779 | A | 10/1986 | Serrano et al. |
| 6,153,852 | A | 11/2000 | Blutke et al. |
| 7,622,693 | B2 * | 11/2009 | Foret ........................ 219/121.43 |
| 2007/0196249 | A1 * | 8/2007 | Fridman et al. ........... 422/186.04 |

FOREIGN PATENT DOCUMENTS

| FR | 2652702 A | 4/1991 |
| GB | 1469317 A | 4/1977 |
| WO | WO 2007/109906 A | 10/2007 |

OTHER PUBLICATIONS

European Search Report for EP0810336 dated Sep. 3, 2008.

* cited by examiner

*Primary Examiner* — Kishor Mayekar
(74) *Attorney, Agent, or Firm* — Heslin Rothenber Farley & Mesiti P.C.

(57) ABSTRACT

In a method for treatment of a dispersed material in a plasma, in which a plasma-forming gas is introduced into a reaction chamber and ionized and a dispersed material is introduced into the reaction chamber and into the area of the plasma, treated under the action of the plasma, and subsequently removed from the area of the plasma, the introduction of the plasma-forming gas and the introduction of the dispersed material are performed independently of one another and from different directions. In an apparatus for treatment of a dispersed material in a plasma, which comprises a reaction chamber having a plasma generator, a first inlet for a plasma-forming gas, and a second inlet for the dispersed material, the second inlet is situated spatially separated in relation to the first inlet so that the dispersed material is conducted from the outside into the plasma.

9 Claims, 4 Drawing Sheets

METHOD AND APPARATUS FOR THE TREATMENT OF DISPERSED MATERIAL

CROSS REFERENCE TO RELATED APPLICATIONS

This application claims priority of European Patent Application No.: EP08103363.1 filed on Apr. 3, 2008, the entire disclosure of which is hereby incorporated herein by reference.

BACKGROUND ART

A method and an apparatus are proposed hereafter for the production, purification, or conversion of dispersed materials in plasma. The method and the device allow an improved process of conversion of dispersed materials under plasma conditions. Dispersed materials are understood as materials which are finely pulverized, the individual particles of the dispersed materials being able to have greatly varying shapes and sizes. For example, the particles may be spherical or elongate, needle-shaped, etc. In many cases, these are mineral materials such as silicon, which is brought into a high-purity state in this way or is obtained by conversion from quartz inside the apparatus by the action of the plasma. Using the proposed method and the device, materials of this type may, for example, be produced in a chemical reaction, be purified of undesired admixtures, or be converted by bonding with other materials.

In known methods and apparatuses, a plasma-forming gas is introduced from above into a reaction chamber and ionized. A dispersed material is simultaneously introduced into the reaction chamber in the same direction, i.e., from top to bottom, so that the dispersed material is purified or converted by the action of the plasma. In all of these known methods and apparatuses, the treatment of the dispersed material is accordingly performed in accordance with the parallel flow principle. Methods and apparatuses which operate according to this principle are described, for example, in U.S. Pat. Nos. 4,379,777, 4,642,207, 4,853,250, 6,379,419, US 2003/0143153 A1, US 2005/0217421 A1, US 2007/0029291 A1, and US 2007/0130656 A1. In general, it is unavoidable in the known methods and apparatuses that a cooled inlet is used for introducing the dispersed material because of the high temperatures in the area of the plasma.

With suitable design, the mass losses of processed material as a result of material vaporization may be reduced and the power-technology characteristic values of the reactor may be improved by selective plasma processing of the material depending on the size of the particles reaching the reactor by the method described hereafter and the proposed apparatus for performing the method. In addition, embodiments of the described method and the apparatus offer an effective design, which is cost-effective in regard to the investment outlay, for removing the processed material and an increase of the continuous target operating time of the plasma reactor.

BRIEF SUMMARY OF THE INVENTION

In a method for treating a dispersed material in a plasma, in which a plasma-forming gas is introduced into a reaction chamber and ionized and a dispersed material is introduced into the reaction chamber and into the area of the plasma, treated under the action of the plasma, and subsequently removed from the area of the plasma, it is proposed that the introduction of the plasma-forming gas and the introduction of the dispersed material be performed independently of one another and from different directions. Due to the spatial separation of the introduction of the plasma-forming gas and the dispersed material, the dispersed material is externally introduced into the plasma inside the reaction chamber. Therefore, in relation to the known solutions, the devices used for introducing the dispersed material into the reaction chamber are subjected to significantly lower temperatures, because the inlet used to introduce the dispersed material is not subjected to the direct action of the plasma. In addition, the action of the plasma on the particles of the dispersed material is reinforced in that the plasma-forming gas and the dispersed material flow in different directions inside the reaction chamber.

In one embodiment of the method, it may be provided that the introduction of the dispersed material is performed opposite to the direction of the introduction of the plasma-forming gas. In particular for elongate reaction chambers, in which the plasma-forming gas and the dispersed material are introduced at the opposing ends of the reaction chamber, due to this embodiment, the velocity difference between the plasma-forming gas and the dispersed material reaches maximum values, by which the effectiveness of the plasma during the treatment of the dispersed material is also maximized.

In another embodiment of the method, it may be provided that the introduction of the dispersed material is performed transversely to the direction of the introduction of the plasma-forming gas. The term "transversely to the direction of the introduction of the plasma-forming gas" in this context is both to comprise the dispersed material being introduced into the reaction chamber exactly perpendicularly to the direction of the plasma-forming gas, and also the dispersed material being introduced in a direction which forms an angle different from 90° with the direction of the plasma-forming gas, for example, in that the dispersed material is introduced diagonally opposite to the plasma-forming gas.

The introduction of the dispersed material may concurrently be performed tangentially to the plasma. The term "tangentially to the plasma" is to indicate that the dispersed material is not introduced exactly into the center of the plasma, but rather into boundary areas of the plasma. This embodiment of the method may be used, for example, for the purpose of supporting the formation of a cyclone inside the reaction chamber, as explained in greater detail hereafter.

In a further embodiment, it may be provided that the plasma-forming gas is introduced rising vertically upward from the lower end of the reaction chamber. In contrast to known methods and apparatuses, the plasma is thus to be generated at the bottom end of the reaction chamber. This provides the condition so that the dispersed material is introduced from above opposite to the introduction direction of the plasma-forming gas, so that the dispersed material reaches the active area of the plasma supported by gravity.

Inside the reaction chamber, it may be provided that the particles of the dispersed material are moved in a cyclone while floating in an operating gas, to reinforce the action of the plasma on the particles and increase the dwell time of the particles in the plasma. The cyclone may be generated in such a way that its axis is coincident with the direction of the introduction of the plasma-forming gas.

Furthermore, it may be provided in the method that the plasma and the cyclone are oriented in relation to one another so that the dispersed material is cooled by the operating gas of the cyclone after the treatment in the plasma. The completely treated particles of the dispersed material may subsequently be removed from the cyclone and optionally also from the reaction chamber.

The apparatus described hereafter is proposed for performing the method. Starting from known plasma reactors, in an apparatus for the treatment of a dispersed material in a plasma, which comprises a reaction chamber having a plasma generator, which has a first inlet for a plasma-forming gas, and which is provided with a second inlet for the dispersed material, it is proposed that the second inlet be situated spatially separated in relation to the first inlet so that the dispersed material is conducted from the outside into the plasma.

The second inlet may be situated diametrically opposite to the first inlet or laterally to the first inlet, for example, "laterally situated" meaning that an outlet opening of the second inlet is directed onto the forming plasma. A configuration of this type of the second inlet may be designed, for example, so that the dispersed material is introduced tangentially to the plasma, "tangentially to the plasma" meaning that the dispersed material is not introduced exactly into the center of the plasma, but rather into boundary areas of the plasma.

In one exemplary embodiment, the first inlet may be situated at the bottom end of the reaction chamber. If the plasma-forming gas is introduced rising vertically in the reaction chamber through this first inlet, the dispersed material may be introduced from the top end of the reaction chamber downward in the vertical direction, for example, but also (alternatively or additionally) may be introduced into the reaction chamber from a lateral direction transversely to the direction of the plasma-forming gas, i.e., horizontally or at an angle different from 90° to the direction of the plasma-forming gas.

Furthermore, means for generating a cyclone may be situated in the reaction chamber. Means of this type for generating a cyclone may comprise a third inlet for an operating gas, a suction pipe, and a fan situated in the suction pipe, for example. The third inlet may be situated opposite to the first inlet in one embodiment of the apparatus. The suction pipe may be situated transversely to the first inlet and open off-center into the reaction chamber, for example. If the first inlet is situated at the bottom end of the reaction chamber having vertically rising inlet direction for the plasma-forming gas, for example, a third inlet opposite to the first inlet having vertically falling inlet direction for the operating gas may be situated at the top end of the reaction chamber. The suction pipe may open in proximity to the third inlet, but perpendicular thereto, the suction pipe having a fan for generating a gas stream inside the reaction chamber and the discharge opening thereof being oriented off-center in relation to the vertically oriented longitudinal axis of the reaction chamber, so that the gas stream generated thereby generates a cyclone inside the reaction chamber.

Furthermore, a collection container may be provided to accommodate the treated dispersed material. This collection container may be situated outside the actual reaction chamber and may be connected to the reaction chamber by a removal connecting piece. For example, the removal connecting piece may be situated at the lower end of the reaction chamber, so that treated particles of the dispersed material fall into this removal connecting piece because of their weight and reach the collection container in this way.

BRIEF DESCRIPTION OF DRAWING FIGURES

The device and the apparatus are explained in greater detail hereafter on the basis of an exemplary embodiment and associated drawings. In the figures.

DETAILED DESCRIPTION

Figure 1:
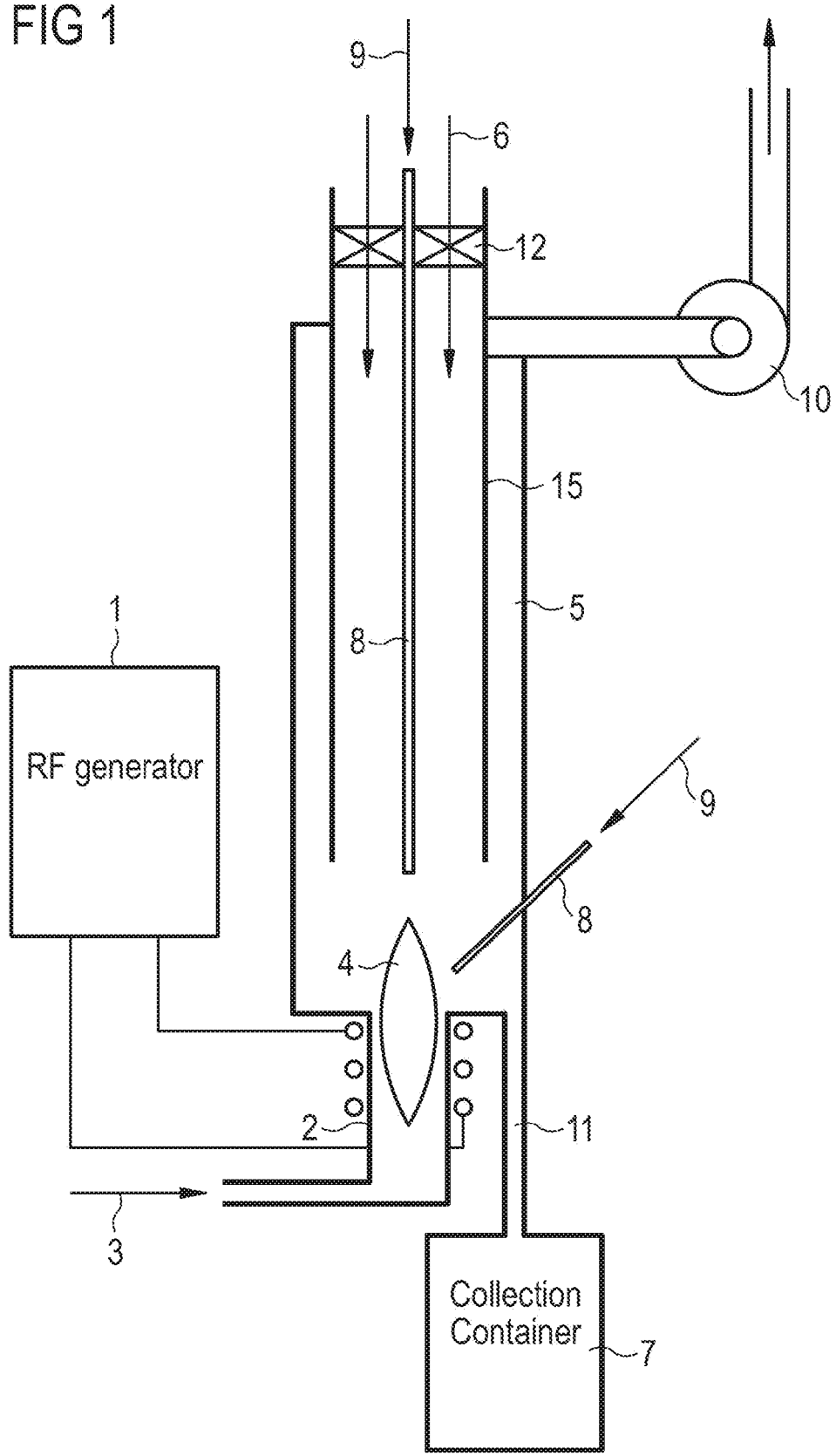
FIG. 1 shows a schematic illustration of a device according to the exemplary embodiment.

The plasma reactor in FIG. 1 comprises a reaction chamber 5, on whose bottom end a plasma generator 2 is situated, to which energy is supplied from an RF generator 1. The reaction chamber 5 has an elongate shape, whose longitudinal axis is vertically oriented. A first inlet 3 for a plasma-forming gas is also situated on the bottom end of the reaction chamber 5 and having central orientation in relation to the plasma generator 2. The plasma-forming gas is thus introduced rising vertically into the reaction chamber 5 from the bottom and subsequently ionized by the action of the plasma generator 2, so that a plasma 4 is implemented in the bottom area of the reaction chamber 5.

A third inlet 6 for an operating gas, which has a filter 12, is situated at the top end of the reaction chamber 5. The third inlet 6 is oriented so that the operating gas is introduced falling vertically into the reaction chamber 5. A second inlet 8 for a dispersed material 9 is situated having central orientation in relation to the third inlet 6, so that the dispersed material 9, with operating gas flowing around it, is introduced falling vertically into the reaction chamber 5. An additional second inlet 8 for a dispersed material 9 is situated in a side wall of the reaction chamber 5 so that alternatively or additionally, dispersed material 9 may be introduced off-center into the plasma 4 at an angle different from 90°.

Inside the reaction chamber 5, the particles of the dispersed material 9 are moved in a cyclone while floating in the operating gas, to reinforce the action of the plasma 4 on the particles and increase the dwell time of the particles in the plasma 4. The cyclone is generated so that its axis is coincident with the direction of the introduction of the plasma-forming gas, i.e., the axis of the cyclone and the introduction of the plasma-forming gas occur vertically, but in opposite directions.

The cyclone inside the reaction chamber is generated by suitable means. In the exemplary embodiment, these means comprise a fan 10, which is connected via a suction pipe off-center on the top area of the reaction chamber 5 and ensures the counter-flow operation of the cyclone.

A collection container 7 for the plasma-processed dispersed material, which is connected via a removal connecting piece 11 to the bottom part of the reaction chamber 5, is provided outside the reaction chamber 5.

Figure 2:
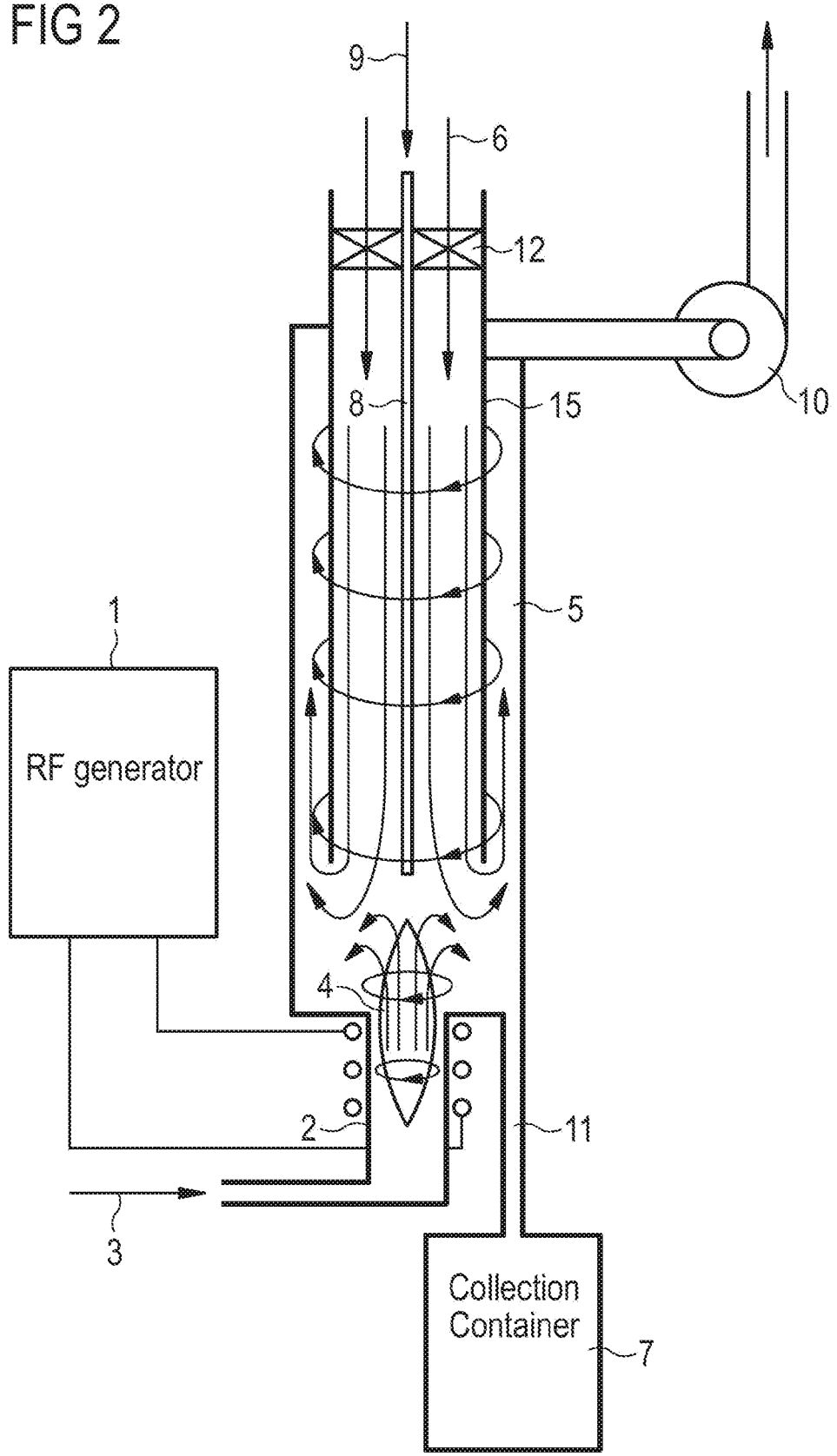
FIG. 2 shows a flowchart to illustrate the axial and tangential components of the gas stream.

FIG. 2 illustrates the axial and tangential components of the gas stream inside the reaction chamber 5. After the plasma generator 2 is turned on, into which swirled plasma-forming gas is introduced via the first inlet 3, and after the warm-up of the cyclone inside the reaction chamber 5, the fan 10 is switched in, by whose function the operating gas for the cyclone is drawn in via the top part of the third inlet 6 situated in the top area of the reaction chamber 5, and the operating gas passes through the filter 12. Both the ambient air and also any arbitrary other gas may be used as the operating gas for the cyclone, depending on what is necessary for performing one or another object of the plasma processing of material. The reactor is constructed in such a way that the direction of the tangential component of the gas stream of the cyclone corresponds in its direction to the tangential component of the plasma stream. Dispersed material is then supplied opposite to the plasma stream, which exits from the plasma generator 2, via the top second inlet 8, which is located on the axis of the cyclone at the apex, and/or via the second inlet 8 situated on the lateral face of the reaction chamber 5.

Figure 3:
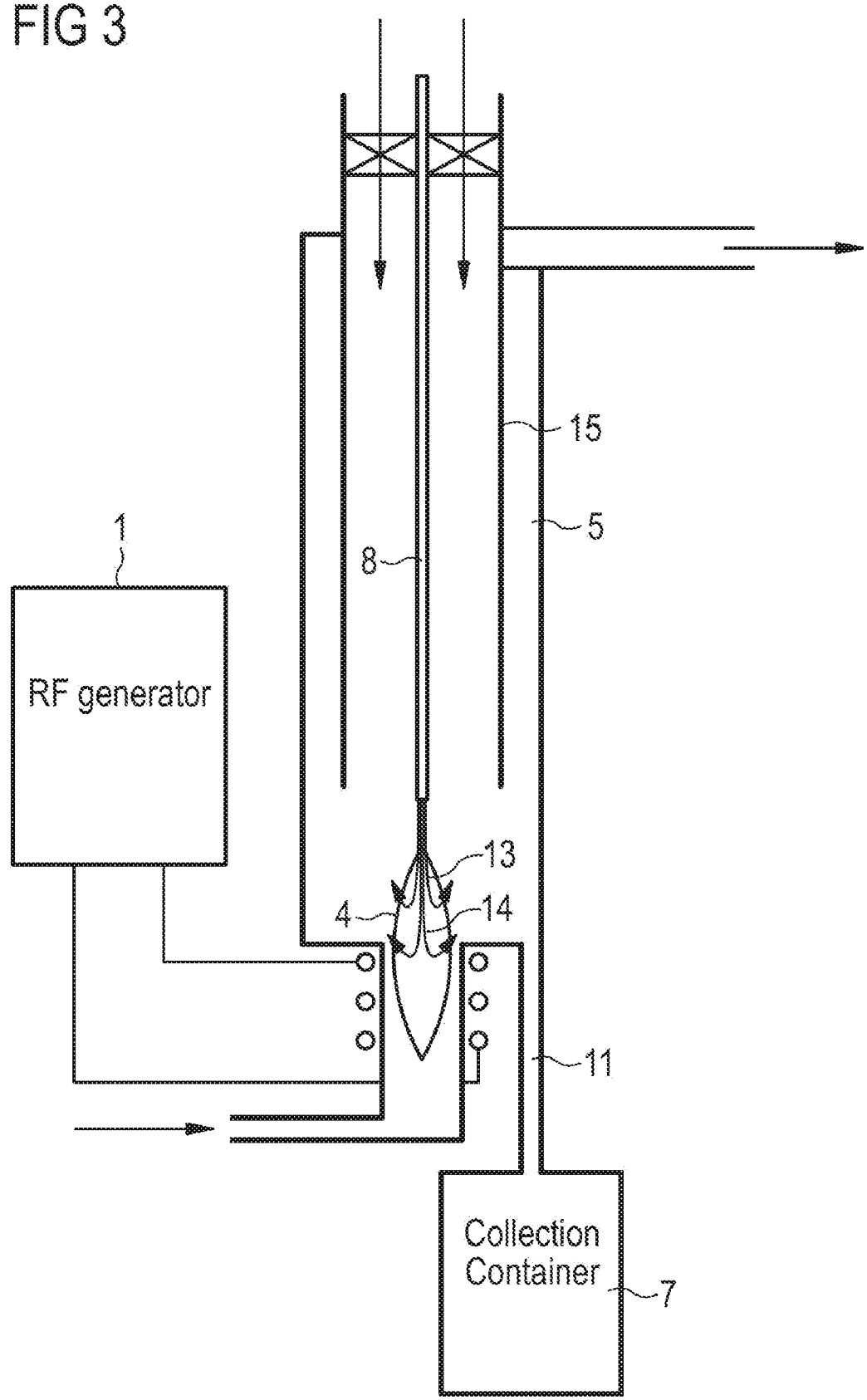
FIG. 3 shows the trajectory of the particles of different sizes upon axial introduction of material into the plasma.
Figure 4:
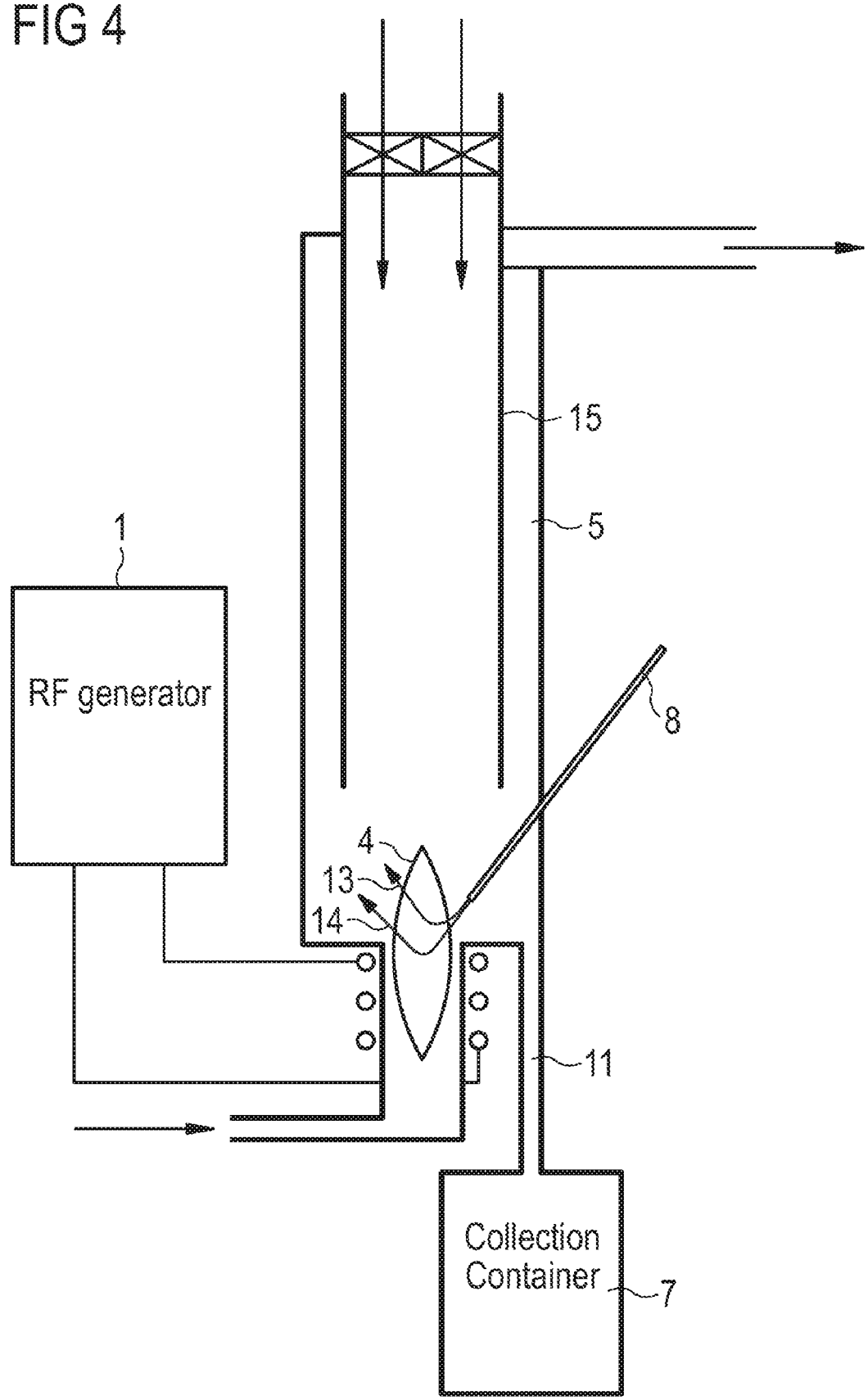
FIG. 4 shows the trajectory of the particles of different sizes upon lateral supply of material into the plasma.

With reference to FIGS. 3 and 4, the trajectories of particles of different sizes upon axial or lateral introduction, respectively, of dispersed material into the plasma are illustrated. The dispersed material, which has a specific size distribution of the particles contained therein, is separated according to size by the oppositely directed plasma stream as a result of the different resistance factors of the individual particle sizes and shapes. Larger particles 14 penetrate over a greater distance into the plasma stream and have a longer trajectory inside the high-temperature zone of the reactor and thus also a longer plasma processing time than smaller particles 13.

The particles which were processed in the high temperature zone of the reactor are spun onto the wall of the reaction chamber 5 as a result of centrifugal force. After cooling by the operating gas of the cyclone, they execute a circular movement along the wall of the reaction chamber 5 and reach the collection container 7 via the removal connecting piece 11, which is situated in the bottom part of the reaction chamber 5.

The control of the process for plasma processing of material is performed by changing the coordinates, using which the material is introduced into the high temperature zone, by varying the power of the plasma generator, and by changing the functional parameters of the fan 10.

It follows from the description that the apparatus offers the capability of selective plasma processing of dispersed material, which reduces the mass losses of material by decreasing the vaporization losses and improves the quality of the plasma processing. For the same reason, the energy expenditure per unit of material to be processed also decreases and the continuous target operating time of the reactor increases as a result of reduced condensate accumulation on the surface of the functional parts of the reactor.

In the exemplary embodiment, the plasma generator 2 was situated with the cyclone in a shared reaction chamber 5. The axis of the plasma generator 2, whose plasma jet 4 is directed vertically upward, corresponds with the axis of the cyclone, so that their gas streams run opposite to one another in comparison to the typical mode of operation of apparatuses of this type. The dispersed material 9 is supplied opposite to the plasma stream 4 via one or more second inlets 8, which are situated on the axis of the plasma generator 2 in the top part of the reaction chamber 5 and/or are located on the lateral face of the reaction chamber 5 and are oriented diagonally opposite to the plasma stream 4 of the plasma generator 2. The practical operation of the proposed plasma reactor during the performance of the described method has shown in our own experiments that the proposed design allows an unlimited continuous operating time of the reactor and results in higher productivity of the plasma reactor with high efficiency of the plasma processing of the material, as well as high efficiency in the removal of the completely processed material (98-99%) at mean particle sizes of the dispersed material of 120-200

The invention claimed is:

1. A method for treatment of a dispersed material in a plasma, comprising:
    introducing a plasma-forming gas into a reaction chamber, the plasma-forming gas being introduced rising vertically from a bottom end of the reaction chamber,
    ionizing the plasma-forming gas to produce a plasma in a bottom area of the reaction chamber,
    introducing a dispersed material into the reaction chamber, and, in an area of the plasma, treating the dispersed material under action of the plasma,
    introducing operating gas falling vertically within an inner sleeve of the reaction chamber,
    generating a gas stream inside the reaction chamber that generates a cyclone of the operating gas inside the reaction chamber, and
    removing the dispersed material from the area of the plasma, wherein the introducing of the plasma-forming gas and the introducing of the dispersed material are performed independently of one another and from different directions.

2. The method according to claim 1, wherein the introducing of the dispersed material is performed in an opposite direction to a direction of the introducing of the plasma-forming gas.

3. The method according to claim 1, wherein the introducing of the dispersed material is performed transversely to a direction of the introducing of the plasma-forming gas.

4. The method according to claim 3, wherein the introducing of the dispersed material is performed tangentially to the plasma.

5. The method according to claim 1, wherein the dispersed material is moved in the cyclone while floating in the operating gas of the cyclone.

6. The method according to claim 5, wherein the cyclone is generated in such a way that an axis of the cyclone is coincident with direction of the introducing of the plasma-forming gas.

7. The method according to claim 5, wherein the dispersed material is cooled by the operating gas of the cyclone after treatment in the plasma.

8. The method according to claim 1, further comprising:
    introducing the operating gas into the inner sleeve of the reaction chamber in a direction opposite to a direction of introducing of the plasma-forming gas, the inner sleeve extending to a vicinity of the plasma.

9. The method according to claim 1, wherein the dispersed material removed from the area of the plasma is spun onto a wall of the reaction chamber by centrifugal force, cooled by the operating gas of the cyclone, and removed from the bottom of the reaction chamber.

* * * * *